US012772117B2

(12) United States Patent
Zhao et al.

(10) Patent No.: US 12,772,117 B2
(45) Date of Patent: Oct. 20, 2026

(54) SENSING METHOD AND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 971 days.

(21) Appl. No.: 18/088,355

(22) Filed: Dec. 23, 2022

(65) Prior Publication Data

US 2023/0217317 A1 Jul. 6, 2023

Related U.S. Application Data

(63) Continuation of application No. PCT/CN2021/092606, filed on May 10, 2021.

(30) Foreign Application Priority Data

Nov. 6, 2020 (WO) ................ PCT/CN2020/127152

(51) Int. Cl.
*H04W 28/26* (2009.01)
*H04W 72/02* (2009.01)
(Continued)

(52) U.S. Cl.
CPC ........... *H04W 28/26* (2013.01); *H04W 72/02* (2013.01); *H04W 72/0446* (2013.01); *H04W 72/563* (2023.01)

(58) Field of Classification Search
CPC . H04W 28/26; H04W 72/02; H04W 72/0446; H04W 72/563; H04W 72/569;
(Continued)

(56) References Cited

U.S. PATENT DOCUMENTS

2013/0322368 A1 12/2013 Nagai et al.
2019/0090250 A1 3/2019 Lee et al.
(Continued)

FOREIGN PATENT DOCUMENTS

CN 106686736 A 5/2017
CN 107889073 A 4/2018
(Continued)

OTHER PUBLICATIONS

Extended European Search Report dated Mar. 26, 2024 received in European Patent Application No. EP21888097.9.
(Continued)

*Primary Examiner* — Rina C Pancholi
(74) *Attorney, Agent, or Firm* — Sheppard, Mullin, Richter & Hampton LLP

(57) ABSTRACT

Embodiments of the present disclosure provide a sensing method and a terminal device, capable of satisfying sensing demands of New Radio-Vehicle to Everything (NR-V2X) in a resource selection process. The sensing method includes: obtaining, by a terminal device, configuration information, wherein the configuration information includes a set of periodicity values for periodic reservation allowed for a target resource pool and/or a periodicity value for sensing by the terminal device; and performing, by the terminal device, sensing based on the configuration information.

18 Claims, 7 Drawing Sheets

200

(51) Int. Cl.
*H04W 72/0446* (2023.01)
*H04W 72/563* (2023.01)

(58) Field of Classification Search
CPC ..... H04W 72/40; H04W 24/02; H04W 72/23; H04W 74/0808; H04W 4/44; H04W 4/46; H04W 76/28; Y02D 30/70
See application file for complete search history.

(56) References Cited

U.S. PATENT DOCUMENTS

| | | | | |
|---|---|---|---|---|
| 2020/0296690 | A1 | 9/2020 | Lee et al. | |
| 2023/0164637 | A1* | 5/2023 | Zhao | H04W 28/26 370/330 |

FOREIGN PATENT DOCUMENTS

| | | | |
|---|---|---|---|
| CN | 109644436 | A | 4/2019 |
| CN | 109906657 | A | 6/2019 |
| CN | 110710296 | A | 1/2020 |
| CN | 111148223 | A | 5/2020 |
| CN | 111316675 | A | 6/2020 |
| CN | 111727624 | A | 9/2020 |
| CN | 111885619 | A | 11/2020 |
| EP | 3651519 | A1 | 5/2020 |
| WO | 2020025040 | A1 | 2/2020 |

OTHER PUBLICATIONS

Huawei et al:"Remaining details of sidelink resource allocation mode 2" 3GPP Draft;R1-2007612, 3RD Generation Partnership Project(3GPP)Mobile Competence Centre;650, Route Des Lucioles: F-06921 ,Sophia-Antipolis Cedex;France, vol. RAN WG1, No. E-meeting;Oct. 26, 2020-Nov. 13, 2020,Oct. 17, 2020 (Oct 17, 2020), XP051939817.

International Search Report and Written Opinion dated Aug. 10, 2021 in International Application No. PCT/CN2021/092606. English translation attached.

Intel Corporation. "Sidelink enhancements for UE power saving", 3GPP TSG RAN WG1 Meeting #103-E, R1-2008998, Oct. 26, 2020(Oct. 26, 2020).

LG Electronics. "Discussion on resource allocation for power saving", 3GPP TSG RAN WG1 Meeting #103-e, R1-2007895, Oct. 26, 2020(Oct. 26, 2020).

Vivo. "Resource allocation for sidelink power saving", 3GPP TSG RAN WG1 #103-e, R1-2007688, Oct. 26, 2020 (Oct. 26, 2020).

Spreadtrum Communications. "Discussion on sidelink resource allocation for power saving", 3GPP TSG RAN WG1 #103e, R1-2008098, Oct. 26, 2020(Oct. 26, 2020).

Samsung. "On resource allocation for power saving", 3GPP TSG RAN WG1 Meeting #103-e, R1-2008189, Oct. 26, 2020(Oct. 26, 2020).

NTT Docomo, Inc. "Discussion on sidelink resource allocation for power saving", 3GPP TSG RAN WG1 #103, R1-2009193, Oct. 26, 2020(Oct. 26, 2020).

International Search Report and Written Opinion dated Jul. 26, 2021 in International Application No. PCT/CN2020/127152. English translation attached.

3GPP TS 36.213 V15.4.0(Release 15), Dec. 2018, Section 14.1.1.6.

The First Office Action from corresponding Chinese Application No. 202310460920.0 dated Aug. 30, 2024.

CMCC, "Discussion on resource allocation for power saving", 3GPP TSG RAN WG1 #103-e, R1-2008031, Section 2.1, Nov. 1, 2020.

Samsung, "On Mode 2 for NR Sidelink", 3GPP TSG RAN WG1 #102-e, R1-2006101, Section 2, Aug. 7, 2020.

* cited by examiner

SENSING METHOD AND TERMINAL DEVICE

CROSS-REFERENCE TO RELATED APPLICATION

The present application is a continuation of International Patent Application No. PCT/CN2021/092606, filed on May 10, 2021, which claims a priority to PCT Patent Application No. PCT/CN2020/127152, entitled "SENSING METHOD AND TERMINAL DEVICE" and filed with China National Intellectual Property Administration on Nov. 6, 2020, the entire disclosures of which are incorporated herein by reference.

FIELD

Embodiments of the present disclosure relate to the field of communication, and more particularly, to a sensing method and a terminal device.

BACKGROUND

Long Term Evolution-Vehicle to Everything (LTE-V2X) supports full or partial sensing. Full sensing means that a terminal can sense data transmitted by other terminals in all slots (or subframes) except a slot in which the terminal transmits data. Partial sensing, which is in the interest of energy saving of the terminal, means that the terminal only needs to sense part of the slots (or subframes) and make a resource selection based on a result of partial sensing.

In LTE-V2X, full or partial sensing supports periodic services, and supported service periods include {20, 50, 100, 200, 300, 400, 500, 600, 700, 800, 900, 1,000} ms (milliseconds). Therefore, in a resource selection process based on full or partial sensing, a periodicity value $P_{step}$=100 ms. In New Radio-Vehicle to Everything (NR-V2X), full or partial sensing supports both periodic and aperiodic services. Periods of the periodic services include {1:99, 100, 200, 300, 400, 500, 600, 700, 800, 900, 1,000} ms, where 1:99 represents all integer values from 1 to 99. In this case, the periodicity value $P_{step}$=100 ms cannot meet a sensing demand of NR-V2X in the resource selection process.

SUMMARY

Embodiments of the present disclosure provide a sensing method and a terminal device.

In a first aspect, a sensing method is provided. The method includes: obtaining, by a terminal device, configuration information, the configuration information including a set of periodicity values for periodic reservation allowed for a target resource pool and/or a periodicity value for sensing by the terminal device; and performing, by the terminal device, sensing based on the configuration information.

In a second aspect, a terminal device is provided for performing the method in the first aspect described above.

In some embodiments, the terminal device includes functional modules configured to perform the method in the first aspect described above.

In a third aspect, a terminal device is provided. The terminal device includes a processor and a memory. The memory stores a computer program. The processor is configured to invoke and execute the computer program stored in the memory to perform the method in the first aspect described above.

In a fourth aspect, an apparatus is provided for implementing the method in the first aspect described above.

In some embodiments, the apparatus includes a processor configured to invoke and execute a computer program from a memory to cause a device provided with the apparatus to perform the method in the first aspect described above.

In a fifth aspect, a computer-readable storage medium is provided. The computer-readable storage medium stores a computer program. The computer program causes a computer to perform the method in the first aspect described above.

In a sixth aspect, a computer program product is provided. The computer program product includes computer program instructions. The computer program instructions cause a computer to perform the method in the first aspect described above.

In a seventh aspect, a computer program is provided. The computer program, when executed on a computer, causes the computer to perform the method in the first aspect described above.

DETAILED DESCRIPTION

Figure 1:
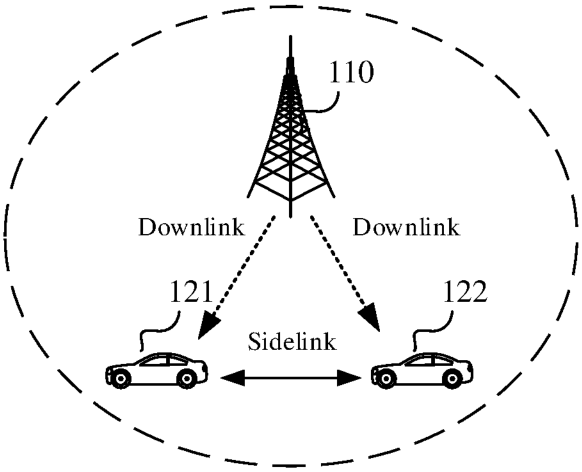
FIG. 1 is a schematic diagram showing an architecture of a communication system provided by the present disclosure.

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, an NR system, an evolution system of the NR system, an LTE-based access to unlicensed spectrum (LTE-U) system, an NR-based access to unlicensed spectrum (NR-U) system, a Non-Terrestrial Network (NTN), a Universal Mobile Telecommunication System (UMTS), a Wireless Local Area Network (WLAN), Wireless Fidelity (WiFi), a 5th-Generation (5G) communication system, or other communication systems, etc.

Generally speaking, conventional communication systems support a limited number of connections and are easy to implement. However, with the development of communication technologies, mobile communication systems will not only support conventional communication, but also will support, for example, Device to Device (D2D) communication, Machine to Machine (M2M) communication, Machine Type Communication (MTC), Vehicle to Vehicle (V2V) communication, Vehicle to Everything (V2X), etc. The embodiments of the present disclosure can also be applied to these communication systems.

Optionally, the communication system in the embodiments of the present disclosure may be applied to a Carrier Aggregation (CA) scenario, a Dual Connectivity (DC) scenario, or a Standalone (SA) network deployment scenario.

Optionally, the communication system in the embodiments of the present disclosure may be applied to an unlicensed spectrum that may also be considered to be a shared spectrum; or the communication system in the embodiments of the present disclosure may also be applied to a licensed spectrum that may also be considered a non-shared spectrum.

The embodiments of the present disclosure are described in conjunction with a network device and a terminal device. Here, the terminal device may also be referred to as User Equipment (UE), an access terminal, a user unit, a user station, a mobile station, a mobile platform, a remote station, a remote terminal, a mobile device, a user terminal, a terminal, a wireless communication device, a user agent, a user apparatus, etc.

The terminal device may be a STATION (ST) in a WLAN, a cellular phone, a cordless phone, a Session Initiation Protocol (SIP) phone, a Wireless Local Loop (WLL) station, a Personal Digital Assistant (PDA) device, a handheld device having a wireless communication function, a computing device or other processing devices connected to a wireless modem, a vehicle-mounted device, a wearable device, and a next-generation communication system, e.g., a terminal device in an NR network or a terminal device in a future-evolved Public Land Mobile Network (PLMN) network.

In the embodiments of the present disclosure, the terminal device may be deployed on land, including indoors or outdoors, in a handheld manner, a wearable manner, or a vehicle-mounted manner; on water (e.g., on a ship); or in the air (e.g., on an aircraft, a balloon, or a satellite).

In the embodiments of the present disclosure, the terminal device can be a mobile phone, a tablet computer (Pad), a computer having a wireless transceiving function, a Virtual Reality (VR) terminal device, an Augmented Reality (AR) terminal device, a wireless terminal devices in industrial control, a wireless terminal device in self-driving, a wireless terminal device in remote medical services, a wireless terminal device in a smart grid, a wireless terminal device in transportation safety, a wireless terminal device in smart city, a wireless terminal device in smart home, etc.

By way of example but not limitation, in the embodiments of the present disclosure, the terminal device may also be a wearable device. The wearable device can also be called a wearable smart device, which is a general term for devices that are wearable and developed by applying wearable technology to intelligently design daily wears, such as glasses, gloves, watches, clothing, shoes, etc. A wearable device is a portable device that is worn directly on the body or integrated into a user's clothing or accessory. The wearable device is not only a hardware device, but also realizes powerful functions through software support, data interaction, and cloud interaction. In a broad sense, wearable smart devices include a fully-functioned, large-size device that can achieve all or partial functions without relying on a smart phone, e.g., a smart watch or a pair of smart glasses, and a device that only focuses on a certain type of application function and needs to cooperate with other devices such as a smartphone, e.g., various types of smart bracelets and smart jewelry that monitor physical signs.

In the embodiments of the present disclosure, the network device may be a device configured to communicate with a mobile device, such as an Access Point (AP) in a WLAN, a Base Transceiver Station (BTS) in a GSM or a CDMA, a base station such as NodeB (NB) in a WCDMA, a base station such as Evolutional Node B (eNB or eNodeB) in an LTE, a relay station or an access point, a vehicle-mounted device, a wearable device, a network device or a base station (gNB) in an NR network, a network device in a future-evolved PLMN network, a network device in an NTN network, etc.

By way of example but not limitation, in the embodiments of the present disclosure, the network device may have a characteristic of mobility. For example, the network device may be a mobile device. Optionally, the network device may be a satellite or a balloon station. For example, the satellite may be a Low Earth Orbit (LEO) satellite, a Medium Earth Orbit (MEO) satellite, a Geostationary Earth Orbit (GEO) satellite, a High Elliptical Orbit (HEO) satellite, etc. Optionally, the network device may also be a base station set up on land, water, etc.

In the embodiments of the present disclosure, the network device provides services for a cell, and a terminal device communicates with the network device through transmission resources (for example, frequency domain resources, or spectrum resources) used by the cell. The cell may be a cell corresponding to the network device (e.g., a base station), and the cell can belong to a macro base station, or belong to a base station corresponding to a small cell. Here, the small cell may include a metro cell, a micro cell, a pico cell, a femto cell, etc. These small cells have characteristics of small coverage and low transmit power, and are suitable for providing high-speed data transmission services.

It should be understood that terms "system" and "network" in the present disclosure are often used interchangeably herein. The term "and/or" in the present disclosure is only describing an association relationship between associated objects, and means that there can be three kinds of relationships. For example, A and/or B can mean three situations: A exists alone, A and B exist at the same time, and B exists alone. In addition, the character "/" in the present disclosure generally represents that associated objects before and after the character "/" are in an "or" relationship.

Terms used in the section of DETAILED DESCRIPTION of the present disclosure are intended only to explain specific embodiments of the present disclosure and are not intended to limit the present disclosure. Terms "first", "second", "third", and "fourth" in the specification, claims, and accompanying drawings of the present disclosure are used to distinguish different objects, rather than to describe a specific sequence. In addition, terms "including" and "having" and any variations thereof are intended to cover non-exclusive inclusions.

It should be understood that the term "indicate" mentioned in the embodiments of the present disclosure may be a direct indication, an indirect indication, or a representation of an association relationship. By way of example, A indicating B may mean A directly indicating B, for example, B may be obtained through A; or A indirectly indicating B, for example, A indicates C and B may be obtained through C; or an association relationship existing between A and B.

In the description of the embodiments of the present disclosure, the term "correspond" may indicate a direct correspondence or an indirect correspondence between two objects in question, or may indicate an association relationship between the two objects in question, or may be a relationship of indicating and being indicated, configuring and being configured, etc.

In the embodiments of the present disclosure, "predefined" may be achieved by pre-saving corresponding codes, tables, or other means that can be used to indicate relevant information in a device (e.g., including the terminal device and the network device). An implementation manner of "predefined" is not limited in the present disclosure. For example, "predefined" may mean "defined in a protocol".

In the embodiments of the present disclosure, the "protocol" may refer to a standard protocol in the field of communication, which may include, for example, an LTE protocol, an NR protocol, and a relevant protocol applied to a future communication system. The present disclosure is not limited to any of these examples.

FIG. 1 is a schematic diagram showing a communication system to which an embodiment of the present disclosure is applicable. Transmission resources of vehicle-mounted terminals (a vehicle terminal 121 and a vehicle terminal 122) are allocated by a base station 110. The vehicle-mounted terminals transmit data on a sidelink based on resources allocated by the base station 110. In some embodiments, the base station 110 may allocate resources for single transmission or semi-persistent transmission to the terminal.

Figure 2:
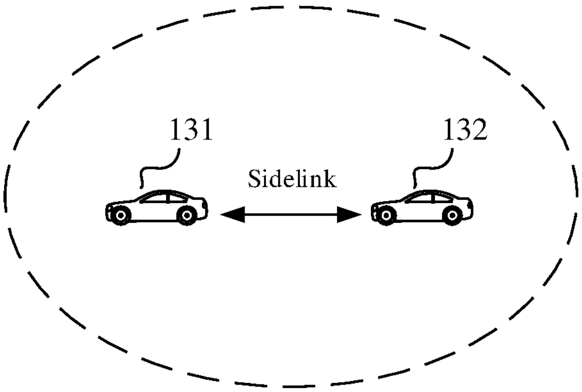
FIG. 2 is a schematic diagram showing an architecture of another communication system provided by the present disclosure.

FIG. 2 is a schematic diagram showing another communication system to which an embodiment of the present disclosure is applicable. Vehicle-mounted terminals (a vehicle-mounted terminal 131 and a vehicle-mounted terminal 132) autonomously select transmission resources from resources of the sidelink for data transmission. Optionally, the vehicle-mounted terminal may select the transmission resources randomly, or select the transmission resources by means of sensing.

Figure 3:
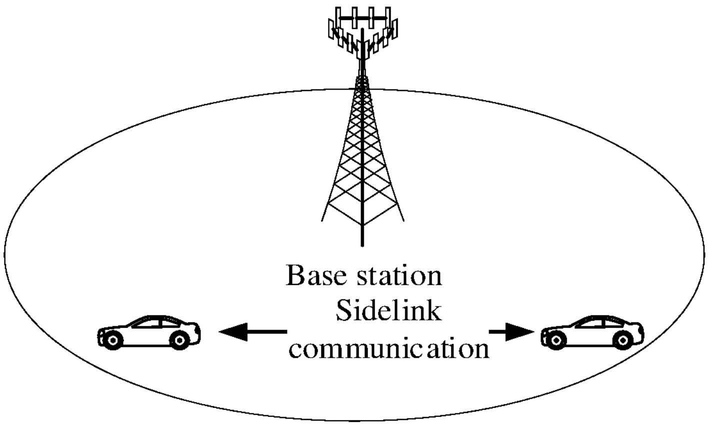
FIG. 3 is a schematic diagram showing sidelink communication within network coverage provided by the present disclosure.
Figure 4:
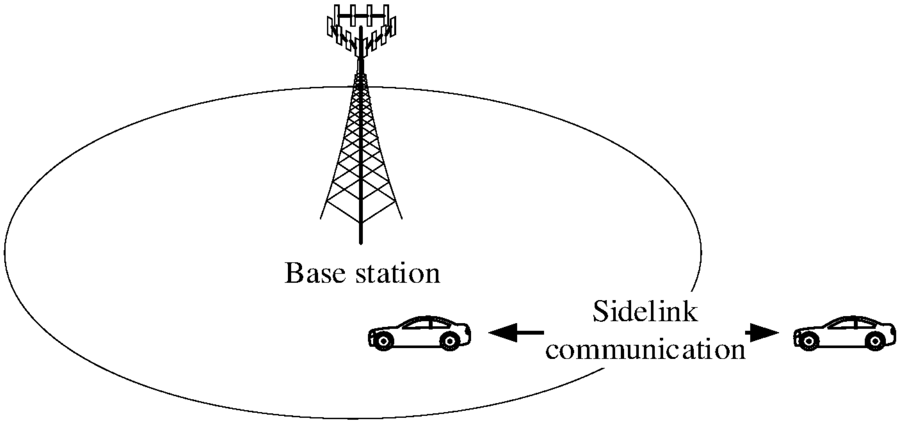
FIG. 4 is a schematic diagram showing sidelink communication under partial network coverage provided by the present disclosure.
Figure 5:
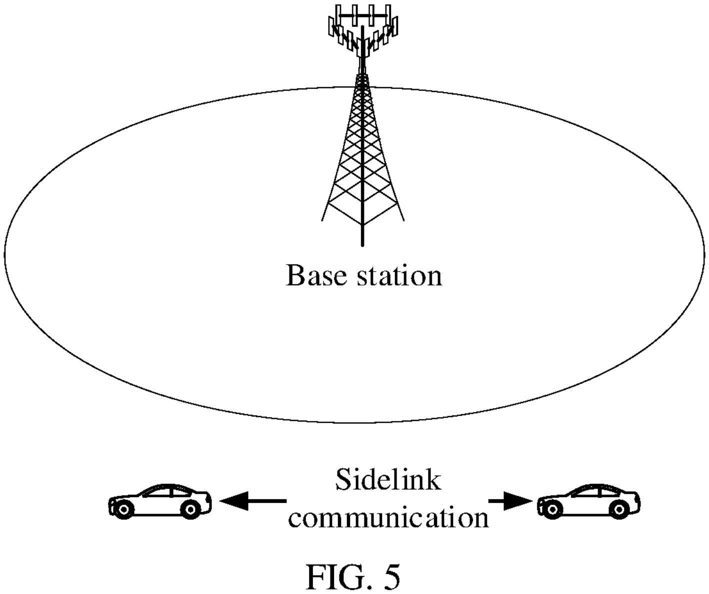
FIG. 5 is a schematic diagram showing sidelink communication outside network coverage provided by the present disclosure.

It should be noted that, according to network coverage situations in which a terminal performing communication is, sidelink communication can be categorized into sidelink communication within network coverage, as illustrated in FIG. 3; sidelink communication under partial network coverage, as illustrated in FIG. 4; and sidelink communication outside network coverage, as illustrated in FIG. 5.

FIG. 3: in the sidelink communication within the network coverage, all the terminals performing sidelink communication are within coverage of a same base station. Therefore, all the terminals may perform the sidelink communication based on a same sidelink configuration via receiving configuration signaling from the base station.

FIG. 4: in a case of the sidelink communication under the partial network coverage, some terminals performing the sidelink communication are located within the coverage of the base station. These terminals may receive the configuration signaling from the base station and perform the sidelink communication based on a configuration of the base station. However, terminals outside the network coverage are incapable of receiving the configuration signaling from the base station. In this case, the terminals outside the network coverage determine a sidelink configuration for the sidelink communication based on pre-configuration information and information carried in a Physical Sidelink Broadcast Channel (PSBCH) that is transmitted by the terminals within the network coverage.

FIG. 5: for the sidelink communication outside the network coverage, all the terminals that perform the sidelink communication are located outside the network coverage, in which case all the terminals determine the sidelink configuration for the sidelink communication based on the pre-configuration information.

It should be noted that D2D communication is a sidelink (SL) transmission technology based on terminal to terminal, which is different from a manner in which communication data is received or transmitted by a base station in a conventional cellular system, and thus has higher spectral efficiency and a lower transmission delay. A V2X system uses direct terminal-to-terminal communication. Two transmission modes are defined in the 3rd Generation Partnership Project (3GPP), which are noted as a first mode and a second mode. The embodiments of the present disclosure can be applied to the second mode.

First mode: transmission resources of the terminal are allocated by the base station. The terminal transmits data on the sideink based on the resources allocated by the base station. The base station may allocate resources for single transmission or semi-persistent transmission for the terminal. As illustrated in FIG. 3, the terminal is located within the network coverage, and a network allocates transmission resources used for sidelink transmission to the terminal.

Second mode: the terminal selects a resource for data transmission from a resource pool. As illustrated in FIG. 5, the terminal is located outside coverage of a cell, and autonomously selects a transmission resource for sidelink transmission from a pre-configured resource pool. Or as illustrated in FIG. 3, the terminal autonomously selects a transmission resource for the sidelink transmission from a resource pool configured by a network.

It should be noted that in NR-V2X, a user may be in a mixed mode. That is, the user may use the first mode and the second mode simultaneously for obtaining a resource.

In NR-V2X, automatic driving is supported. Therefore, higher requirements are imposed on data interaction between vehicles, such as higher throughput, lower delay, higher reliability, larger coverage, and more flexible resource allocation.

Figure 6:
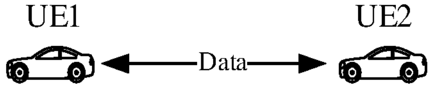
FIG. 6 is a schematic diagram showing unicast sidelink communication provided by the present disclosure.
Figure 7:
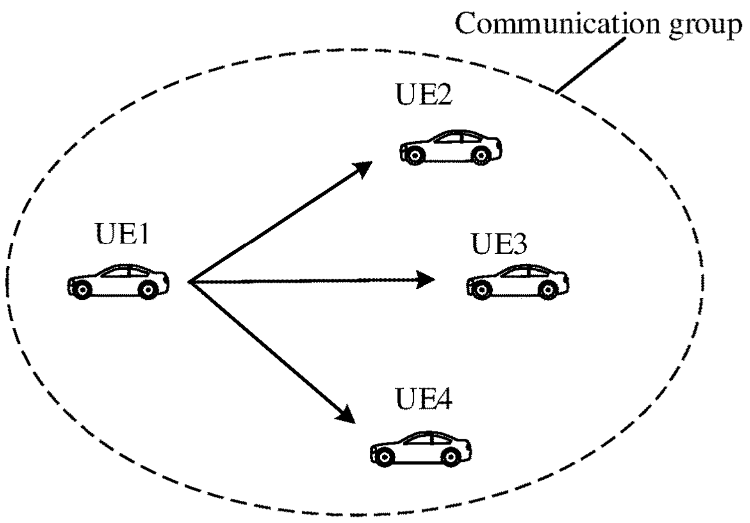
FIG. 7 is a schematic diagram showing multicast sidelink communication provided by the present disclosure.
Figure 8:
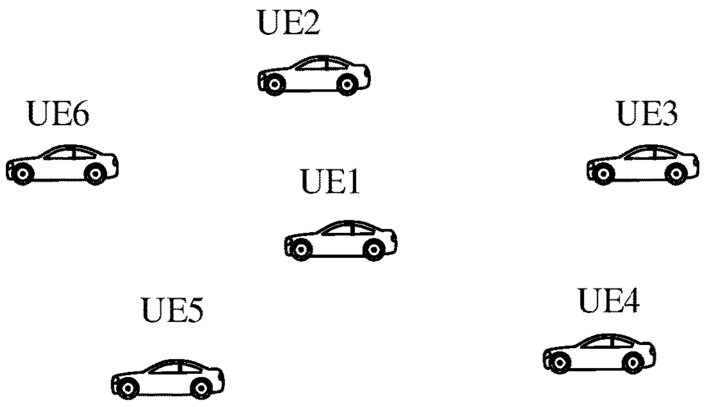
FIG. 8 is a schematic diagram showing broadcast sidelink communication provided by the present disclosure.

In LTE-V2X, broadcast transmission is supported. In NR-V2X, unicast and multicast transmission are introduced. For the unicast transmission, there is only one receiving-end terminal. As illustrated in FIG. 6, the unicast transmission is performed between UE1 and UE2. For the multicast transmission, all terminals within one communication group or all terminals within a certain transmission distance are receiving-end terminals. As illustrated in FIG. 7, UE1, UE2, UE3, and UE4 form a communication group, in which UE1 transmits data and the remaining terminal devices in the communication group are all receiving-end terminals. For the broadcast transmission, any terminal around a transmitting-end terminal is a receiving end. As illustrated in FIG. 8, UE1 is a transmitting-end terminal while the other terminals around UE, UE2 to UE6, are receiving-end terminals.

For better understanding of the embodiments of the present disclosure, an NR Uu interface-relevant DRX mechanism related to the present disclosure is explained.

In a wireless network, when data needs to be transmitted, a UE needs to monitor a Physical Downlink Control Channel (PDCCH) all the time, and transmit and receive data based on an indication message transmitted from a network side, which results in a high power consumption of the UE and large delay of data transmission. Therefore, the 3GPP standard protocol introduces a DRX energy saving strategy to an LTE system.

Figure 9:
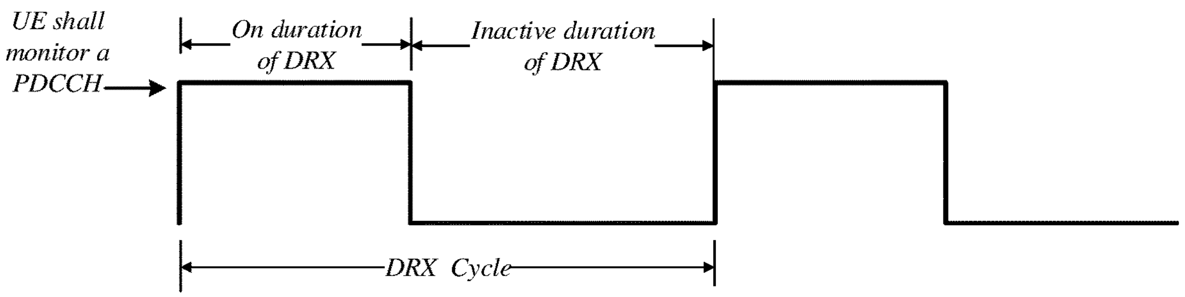
FIG. 9 is a schematic diagram showing a Discontinuous Reception (DRX) mechanism provided by the present disclosure.

Referring to FIG. 9, a UE in a Radio Resource Control Connected (RRC_CONNECTED) state is configured with a DRX cycle, which includes an On Duration and an Opportunity for DRX. During the On Duration, the UE monitors and receives a PDCCH. The On Duration may be called an Active Duration or Active Time. During the Opportunity for DRX, the UE receives no PDCCH to reduce power consumption. The Opportunity for DRX may be called an Inactive Duration or Inactive Time. In contrast to a DRX on duration, the Opportunity for DRX may also be referred to as a DRX off duration.

In a DRX operation, the terminal controls an On Duration and an Off Duration of the terminal based on timer parameters configured by a network.

For better understanding of the embodiments of the present disclosure, an SL-relevant DRX mechanism related to the present disclosure is explained.

In an energy saving and power reduction mechanism of the terminal, for a purpose of energy saving, it is considered to introduce a DRX mechanism to the SL, i.e., SL DRX. Similar to the DRX mechanism of the Uu interface, the SL-relevant DRX mechanism allows the terminal to receive data transmitted by other terminals in the On Duration, and enter a sleep state in the DRX Off Duration when no data is detected, aiming to lower power consumption. A duration when the terminal is in the On Duration is determined by a DRX configuration parameter drx_onDurationTimer.

A resource pool is introduced to a sidelink transmission system. The resource pool is a set of transmission resources. Both transmission resources configured by the network and transmission resources autonomously selected by the terminal are resources in the resource pool. The resource pool may be configured by a pre-configuration or a network configuration. One or more resource pools may be configured. Resource pools are categorized into a transmission resource pool and a receiving resource pool. The transmission resource pool means that transmission resources in this resource pool are used to transmit sidelink data. The receiving resource pool means that the terminal receives sidelink data on transmission resources in this resource pool.

For better understanding of the embodiments of the present disclosure, a sensing-based resource selection method related to the present disclosure is explained.

LTE-V2X supports full or partial sensing. Full sensing means that the terminal can sense data transmitted by other terminals in all slots (or subframes) except a slot in which the terminal transmits data. Partial sensing, which is in the interest of energy saving of the terminal, means that the terminal only needs to sense part of the slots (or subframes) and make a resource selection based on a result of partial sensing.

In some embodiments, when partial sensing is not configured at an upper layer, full sensing is adopted for the resource selection by default.

Figure 10:
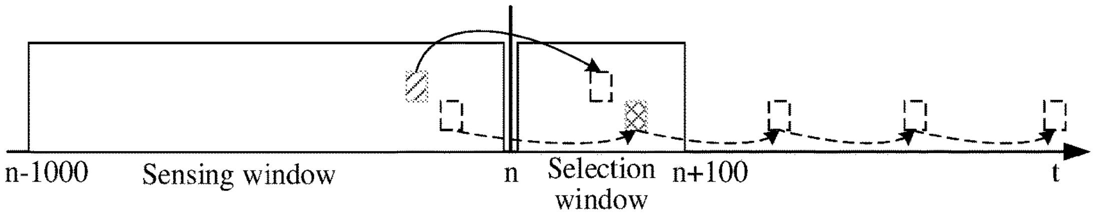
FIG. 10 is a schematic diagram showing a resource selection provided by the present disclosure.

When a new packet arrives at a time point n and the resource selection is required, the terminal performs the resource selection within $[n+T_1, n+T_2]$ ms based on a sensing result in a past 1 second, where $T_1 <= 4$, and $T_{2min}(prio_{TX}) \le T_2 \le 100$. $T_{2min}(prio_{TX})$ is a parameter configured by the upper layer. $T_1$ should be greater than a processing delay of the terminal, and $T_2$ should be within a delay requirement range of a service. For example, when a delay requirement of a service is 50 ms, $20 \le T_2 \le 50$; and when the delay requirement of the service is 100 ms, $20 \le T_2 \le 100$, as illustrated in FIG. 10.

A process of the resource selection by the terminal in a selection window is as follows (for a specific resource selection process, reference may be made to operation steps described in the above standard. Several major resource selection steps are listed here).

The terminal treats all available resources in the selection window as a set A, and performs an exclusion operation on the resources in the set A.

1. When the terminal obtains no sensing results for some subframes within the sensing window, resources on corresponding subframes within the selection window for these subframes are excluded.
2. When the terminal detects a Physical Sidelink Control Channel (PSCCH) in the sensing window, Reference Signal Received Power (RSRP) of a Physical Sidelink Shared Channel (PSSCH) scheduled by the PSCCH is measured. When the measured PSSCH-RSRP is higher than a PSSCH-RSRP threshold, and a reserved transmission resource of control information determined based on reservation information of the control information is determined to be in a resource conflict with data to be transmitted by a user, the user excludes the transmission resource from the set A. The PSSCH-RSRP threshold is determined based on priority information carried in the detected PSCCH and a priority of data to be transmitted by the terminal.
3. When a number of remaining resources in the set A is smaller than 20% of a total number of resources, the terminal may raise the PSSCH-RSRP threshold by 3 dB, and repeat steps 1 and 2 until the number of remaining resources in the set A is greater than 20% of the total number of resources.
4. The terminal performs a Sidelink Received Signal Strength Indicator (S-RSSI) detection on the remaining resources in the set A, sorts the remaining resources in the set A based on their energy levels, and puts resources having lowest energy, 20% relative to the number of resources in the set A, into a set B.
5. The terminal selects a resource from the set B equiprobably for data transmission.

Compared with full sensing, the terminal based on partial sensing selects Y slots in a resource selection window, and determines, based on a sensing result, whether resources on the Y slots can be used as candidate resources. When the resources on the Y slots can be used as the candidate resources, the resources are put into a set $S_B$. When a number of elements in the set $S_B$ is greater than or equal to 20% of a total number of the resources on the Y slots, $S_B$ is reported to the upper layer.

In LTE-V2X, $P_{step}$=100 ms in the resource selection process based on partial sensing.

In LTE-V2X, full sensing or partial sensing supports periodic services, and supported service periods include {20, 50, 100, 200, 300, 400, 500, 600, 700, 800, 900, 1,000} ms. Therefore, in the resource selection process based on full sensing or partial sensing, $P_{step}$=100 ms. In NR-V2X, full sensing or partial sensing supports both periodic and aperiodic services. Periods of the periodic services include {1:99, 100, 200, 300, 400, 500, 600, 700, 800, 900, 1,000} ms, where 1:99 represents all integer values from 1 to 99. In this case, periodicity values (e.g., 1:99) supported by some terminals are smaller than $P_{step}$=100 ms. That is, $P_{step}$=100 ms cannot meet a sensing demand of NR-V2X in the resource selection process and is no longer suitable for a sensing process.

Based on the above problems, the present disclosure provides a sensing scheme that can meet the sensing demand of NR-V2X in the resource selection process.

The technical solutions of the present disclosure are described in detail below through specific embodiments.

Figure 11:
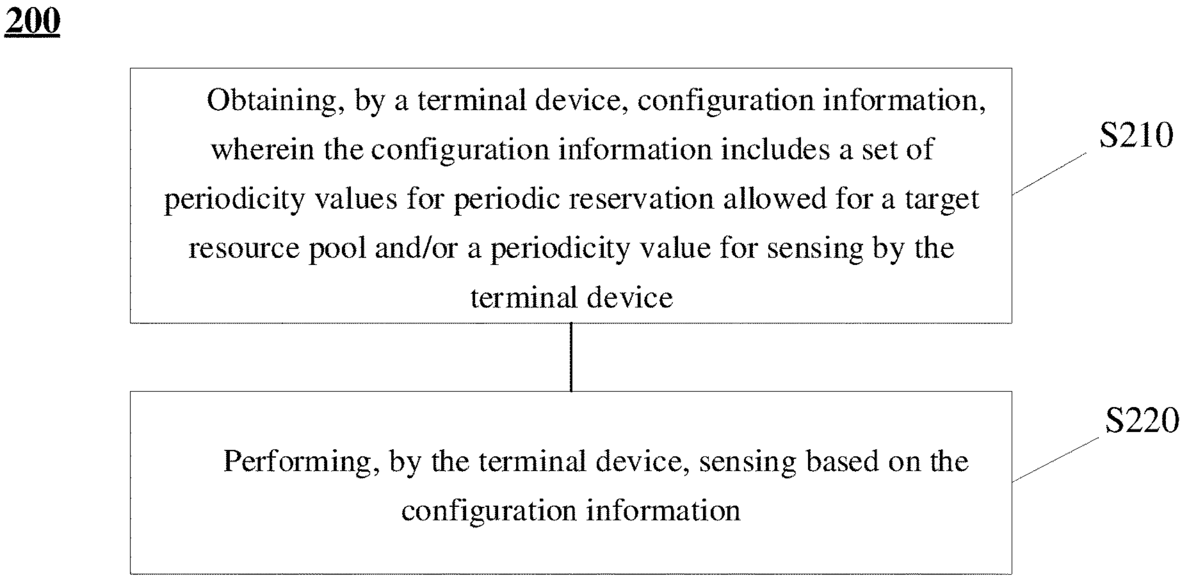
FIG. 11 is a schematic flowchart illustrating a sensing method according to an embodiment of the present disclosure.

FIG. 11 is a schematic flowchart illustrating a sensing method 200 according to an embodiment of the present disclosure. As illustrated in FIG. 11, the sensing method 200 may include at least some of the following disclosure.

At S210, a terminal device obtains configuration information. The configuration information includes a set of periodicity values for periodic reservation allowed for a target resource pool and/or a periodicity value for sensing by the terminal device.

At S220, the terminal device performs sensing based on the configuration information.

In the embodiments of the present disclosure, the terminal device may perform the sensing based on the set of periodicity values for the periodic reservation allowed for the target resource pool and/or the periodicity value for sensing by the terminal device. Therefore, periodicity values selected by the terminal device for the sensing in the resource selection process are all supported by the terminal device, which meet the sensing demand of NR-V2X in the resource selection process. The periodicity values for the periodic reservation allowed for the target resource pool may also be called resource reservation periods.

Optionally, the embodiments of the present disclosure may be applied to partial sensing.

In the embodiments of the present disclosure, the terminal device may obtain the configuration information from resource pool configuration information or from a network device.

The periodicity values for the periodic reservation supported by NR-V2X include {1:99, 100, 200, 300, 400, 500, 600, 700, 800, 900, 1,000} ms, where 1:99 represents all integer values from 1 to 99. However, in a resource pool, the set of periodicity values for the periodic reservation allowed for a current resource pool may be indicated in the resource pool configuration information. The set includes up to sixteen elements. When an element in the set takes a value of 0, it indicates that the current resource pool supports aperiodic service transmission. That is, no periodic reservations are made.

Optionally, the set of periodicity values allowed for the target resource pool includes at least one and up to sixteen periodicity values of 0 ms, 1 ms, 2 ms, . . . , 99 ms, 100 ms, 200 ms, 300 ms, 400 ms, 500 ms, 600 ms, 700 ms, 800 ms, 900 ms, or 1,000 ms.

It should be noted that 1 ms, 2 ms, . . . , 99 ms is equivalent to a number of milliseconds indicated by 1:99 described above.

Optionally, the target resource pool supports the aperiodic service transmission when the set of periodicity values allowed for the target resource pool includes 0 ms.

Optionally, the configuration information may include a sidelink resource reservation period (SL-ResourceReserve-Pediod), which is used to indicate the set of periodicity values for the periodic reservation allowed for the target resource pool.

In the embodiments of the present disclosure, the periodicity value for sensing by the terminal device is used to indicate a periodicity value, based on which the terminal device performs the sensing. For example, when the periodicity value for sensing by the terminal device is 100 ms or 200 ms, the terminal device needs to sense slots corresponding to y−100 ms and corresponding to y−200 ms in a case where the terminal device needs to determine whether a resource is available on a slot y.

Optionally, in the embodiments of the present disclosure, different energy saving levels correspond to different periodicity values of the sensing by the terminal device; or different priorities correspond to different periodicity values of the sensing by the terminal device.

That is, the periodicity value for sensing by the terminal device is related to energy saving levels. For different energy saving levels, periodicity values are configured at which terminals at the different energy saving levels need to sense. Or the periodicity value for sensing by the terminal device is related to priorities. For terminals at different priorities, periodicity values are configured at which the terminals need to sense.

Optionally, the priority may be determined based on priority information carried in Sidelink Control Information (SCI).

Optionally, in the embodiments of the present disclosure, the terminal device may select a transmission resource based on a sensing result.

Optionally, the operation at S220 may be specifically one of the following embodiments.

Embodiment 1

The terminal device selects at least Y slots in a selection window, Y being a positive integer. The terminal device senses a resource on a slot $$t_{y-P_s}^{SL}$$

for sidelink transmission, where $$t_y^{SL}$$

represents a slot y for sidelink transmission, the slot y being any one of the at least Y slots;

$$t^{SL}_{y-P_s}$$

represents a slot y−$P_s$ for sidelink transmission; and $P_s$ represents any non-zero periodicity value in the set of periodicity values allowed for the target resource pool, or $P_s$ represents the periodicity value for sensing by the terminal device.

Optionally, the terminal device selects the at least Y slots in the selection window based on a minimum number of candidate slots in the target resource pool.

Optionally, the terminal device may determine the minimum number of candidate slots based on a priority of data to be transmitted and/or a Channel Busy Ratio (CBR).

Optionally, the terminal device may also determine the minimum number of candidate slots based on an energy saving level. The energy saving level is determined based on a capacity of the terminal device and/or a remaining battery level of the terminal device.

Optionally, the minimum number of candidate slots may also be a parameter in the configuration information. That is, the configuration information may also include the minimum number of candidate slots.

In some embodiments, corresponding minimum numbers of candidate slots are configured separately for sidelink resource reservation periods in the target resource pool.

For example, resource reservation periods allowed for a resource pool are 100 ms, 200 ms, and 300 ms respectively. The resource pool configuration information includes configuration information to configure minimum numbers of candidate slots corresponding to the three resource reservation periods to be 10, 20, and 30, respectively.

In some embodiments, the terminal device determines the minimum number of candidate slots based on period information of the data to be transmitted.

It should be noted that the minimum number of candidate slots may also be called a minimum number of candidate subframes (minNumCandidateSF), which is not limited in the present disclosure.

Figure 12:
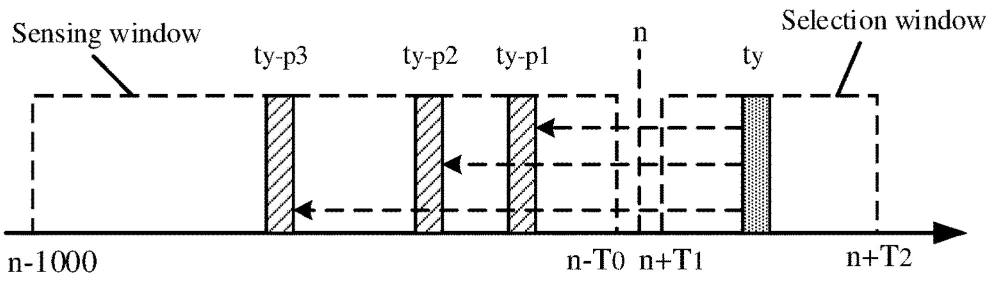
FIG. 12 is a schematic diagram showing sensing according to an embodiment of the present disclosure.

For example, as illustrated in FIG. 12, the terminal device triggers a resource selection or a resource reselection at a time point n, and a position of the selection window is determined to be [n+$T_1$, n+$T_2$]. The terminal device determines, based on configuration information, to select at least Y=10 slots in this selection window. The terminal device selects 10 slots from a range of slots [n+10, n+19]. For any of the 10 slots, the terminal device senses the slot $$t^{SL}_{y-P_s}$$

in the sensing window. FIG. 12 exemplifies that the set of periodicity values for the periodic reservation allowed for the target resource pool includes 3 values, i.e., $P_1$, $P_2$, and $P_3$, and thus the terminal device senses a slot $$t^{SL}_{y-P_1},$$

a slot $$t^{SL}_{y-P_2},$$

and a slot $$t^{SL}_{y-P_3},$$

respectively.

Embodiment 2

The terminal device selects at least Y slots in a selection window, Y being a positive integer. The terminal device senses a resource on a slot $$t^{SL}_{y-P'_s}$$

for sidelink transmission, where $$t^{SL}_{y}$$

represents a slot y for sidelink transmission, the slot y being any one of the at least Y slots;

$$t^{SL}_{y-P'_s}$$

represents a slot y−$P_s$', for sidelink transmission; $P_s$" represents a number of logical slots corresponding to $P_s$, or $P_s$" represents a number of logical slots corresponding to $P_s$ in the target resource pool; and $P_s$ represents any non-zero periodicity value in the set of periodicity values allowed for the target resource pool, or $P_s$ represents the periodicity value for sensing by the terminal device.

Optionally, $$P'_s = \left\lceil \frac{N}{20\text{ ms}} \times P_s \right\rceil,$$

where N represents a number of slots available for sidelink transmission in 20 ms. Optionally, N is determined based on a network configuration parameter Time Division Duplex Uplink-Downlink Common Configuration (TDD-UL-DL-ConfigCommon) used to indicate a slot configuration of a system. A slot is available for sidelink transmission when L consecutive symbols in the slot starting from a time domain symbol S are all uplink symbols. N represents the number of slots available for the sidelink transmission in a time period of 20 ms. S is determined based on a parameter sidelink start symbol (SL-StartSymbol) and L is determined based on a parameter sidelink symbol length (SL-LengthSymbols). Optionally, for proprietary carriers or proprietary spectra, all slots are available for sidelink transmission, in which case a value of the parameter N is the number of slots corresponding to the time period of 20 ms.

Embodiment 3

The terminal device selects at least Y slots in a selection window, Y being a positive integer. The terminal device refrains from sensing any resource on a slot $$t^{SL}_{y-P'_s}$$

when y−$P_s$' is grater than or equal to 0; or the terminal device senses a resource on a slot $$t^{SL}_{y-P'_s}$$

when y−$P_s$' is smaller than 0; or the terminal device senses the resource on the slot $$t^{SL}_{y-P'_s}$$

when y−$P_s$' is smaller than 0 and the slot $$t^{SL}_{y-P'_s}$$

is located within a sensing window, where $$t^{SL}_{y}$$

represents a slot y for sidelink transmission, the slot y being any one of the at least Y slots;

$$t^{SL}_{y-P'_s}$$

represents a slot y−$P_s$' for sidelink transmission; $P_s$' represents a number of logical slots corresponding to $P_s$, or $P_s$' represents a number of logical slots corresponding to $P_s$ in the target resource pool; and $P_s$ represents any non-zero periodicity value in the set of periodicity values allowed for the target resource pool, or $P_s$ represents the periodicity value for sensing by the terminal device.

Embodiment 4

The terminal device selects at least Y slots in a selection window, Y being a positive integer. The terminal device senses a resource on a slot $$t^{SL}_{y-q*P'_s}$$

for sidelink transmission when $P_s<T_s$; or the terminal device senses a resource on a target slot for sidelink transmission when $P_s<T_s$. The target slot is a slot located within a sensing window among Q slots corresponding to $$t^{SL}_{y-q*P'_s},$$

or the target slot is the last one of slots located within the sensing window among the Q slots corresponding to $$t^{SL}_{y-q*P'_s},$$

where $T_s$ represents a number of milliseconds corresponding to an end position of the selection window;

$$t^{SL}_{y}$$

represents a slot y for sidelink transmission, the slot y being any one of the at least Y slots;

$$t^{SL}_{y-q*P'_s}$$

represents a slot y−q*$P_s$' for sidelink transmission; $P_s$' represents a number of logical slots corresponding to $P_s$, or $P_s$' represents a number of logical slots corresponding to $P_s$ in the target resource pool; $P_s$' represents any non-zero periodicity value in the set of periodicity values allowed for the target resource pool, or $P_s$ represents the periodicity value for sensing by the terminal device; q=1, 2, . . . , Q, $$Q=\left\lceil\frac{T_s}{P_s}\right\rceil,$$

and $T_s$ is determined based on the end position $T_2$ of the selection window [n+$T_1$, n+$T_2$].

For example, the terminal device performs the resource selection at a slot n, and the selection window is determined to be [n+4, n+100], where 4 and 100 represent a 4-th slot and a 100-th slot after the slot n, respectively. When a subcarrier spacing is 30 kHz, the end position corresponding to the selection window, i.e., n+100, is 50 ms after the slot n. That is, $T_s$=50. For a period of 10 ms allowed for the resource pool, i.e., $P_s$=10, when proprietary carriers are considered, i.e., all the slots are available for the sidelink transmission, $P_s$'=10, and Q=5. When the terminal device selects a slot n+10 in the selection window, slots where periodic transmission is located before the slot n+10 are a slot n, a slot n−10, a slot n−20, a slot n−30, and a slot n−40. The sensing window determined by the terminal device is [n−100, n−1], and thus a slot that the terminal device needs to sense in the sensing window is the slot n−10, i.e., a slot of the last periodic transmission before the slot n+10 in the sensing window.

Embodiment 5

The terminal device selects at least Y slots in a selection window, Y being a positive integer. The terminal device determines to sense a resource on a slot $$t^{SL}_{y-P'_s}$$

for sidelink transmission. The terminal device senses, when the slot $$t_{y-P'_s}^{SL}$$

does not belong to the target resource pool, the first slot belonging to the target resource pool after the slot $$t_{y-P'_s}^{SL},$$

or senses, when the slot $$t_{y-P'_s}^{SL}$$

does not belong to the target resource pool, the first slot belonging to the target resource pool before the slot $$t_{y-P'_s}^{SL},$$

where $$t_y^{SL}$$

represents a slot y for sidelink transmission, the slot y being any one of the at least Y slots;

$$t_{y-P'_s}^{SL}$$

represents a slot y−$P_s$' for sidelink transmission; $P_s$' represents a number of logical slots corresponding to $P_s$, or $P_s$' represents a number of logical slots corresponding to $P_s$ in the target resource pool; and $P_s$ represents any non-zero periodicity value in the set of periodicity values allowed for the target resource pool, or $P_s$ represents the periodicity value for sensing by the terminal device.

That is, the terminal device performs the sensing within its transmission resource pool. For example, the terminal device selects the slot $$t_y^{SL}$$

from the target resource pool (the transmission resource pool of the terminal device) in the selection window, determines the sensing slot $$t_{y-P'_s}^{SL}$$

in the sensing window based on a service periodicity value allowed for the target resource pool, and senses, when the slot $$t_{y-P'_s}^{SL}$$

does not belong to the target resource pool, the 1-st slot belonging to the target resource pool after the slot $$t_{y-P'_s}^{SL},$$

or the 1-st slot belonging to the target resource pool before the slot $$t_{y-P'_s}^{SL}.$$

It should be noted that the manner in Embodiment 5 can be applied to the above-mentioned Embodiments 1 to 4. That is, in Embodiment 1, when $$t_{y-P_s}^{SL}$$

does not belong to the target resource pool, the terminal device senses the first slot belonging to the target resource pool after the slot $$t_{y-P_s}^{SL}$$

or senses the first slot belonging to the target resource pool before the slot $$t_{y-P_s}^{SL};$$

in Embodiment 2 or Embodiment 3, when $$t_{y-P'_s}^{SL}$$

does not belong to the target resource pool, the terminal device senses the first slot belonging to the target resource pool after the slot $$t_{y-P'_s}^{SL}$$

or senses the first slot belonging to the target resource pool before the slot $$t_{y-P'_s}^{SL};$$

and in Embodiment 4, when $$t_{y-q*P'_s}^{SL}$$

does not belong to the target resource pool, the terminal device senses the first slot belonging to the target resource pool after the slot $$t^{SL}_{y-q*P'_s}$$

or senses the first slot belonging to the target resource pool before the slot $$t^{SL}_{y-q*P'_s}.$$

It should be understood that in the above embodiments, the target resource pool is a resource pool in which the terminal performs the sensing, or the resource pool is a resource pool in which the terminal performs the resource selection.

In some embodiments, the terminal device may select the at least Y slots based on DRX configuration information of the terminal device.

In some embodiments, the terminal device determines a first time range based on the DRX configuration information of the terminal device, and selects the at least Y slots based on the first time range. The terminal device is in a DRX ON state during the first time range.

In some embodiments, the at least Y slots include all slots within the first time range.

Figure 13:
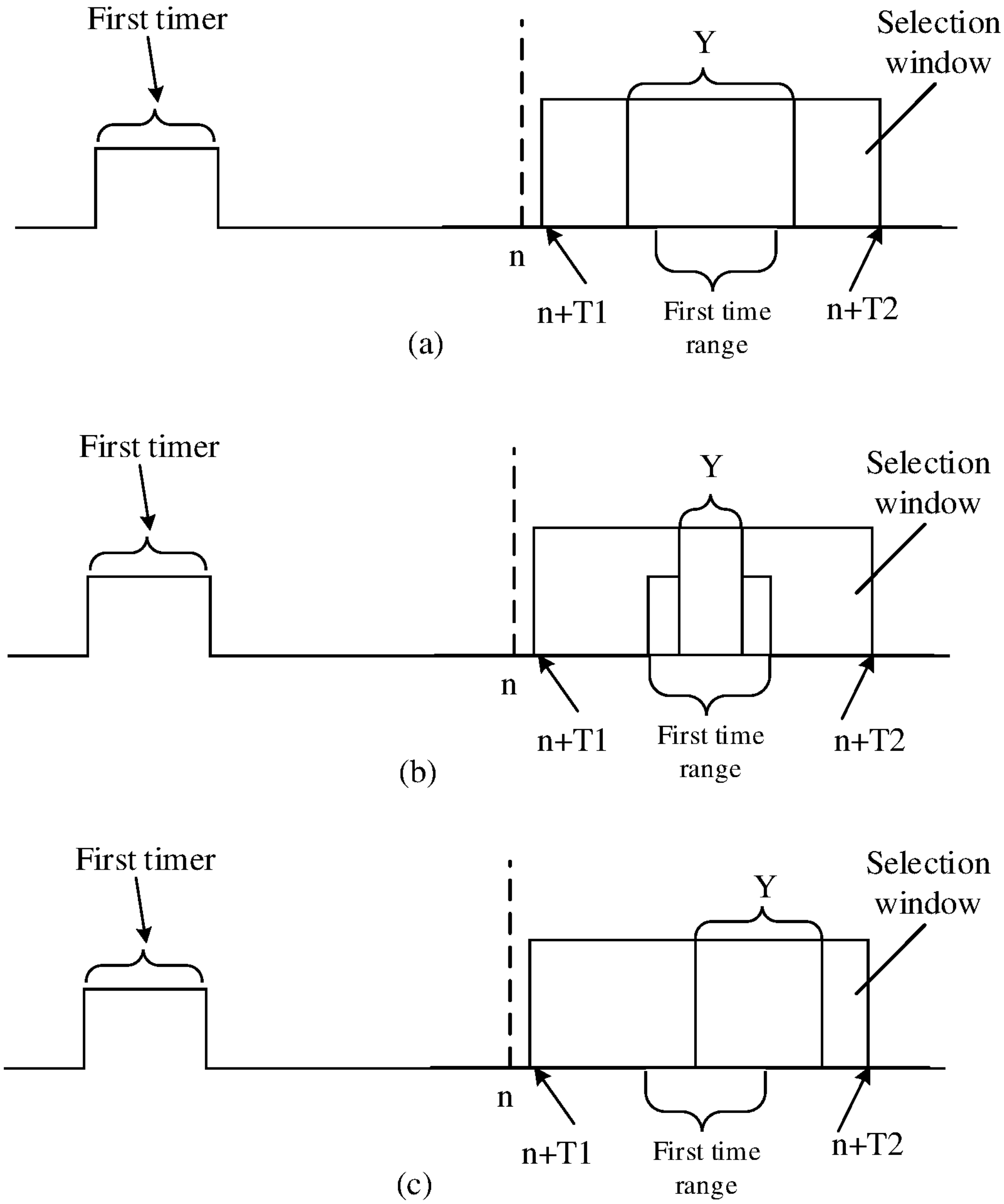
FIG. 13 is a schematic diagram showing at least Y slots according to an embodiment of the present disclosure.

For example, when a number of slots included in the at least Y slots is greater than a number of slots included in the first time range, the at least Y slots include all the slots within the first time range, as illustrated in (a) of FIG. 13.

In some embodiments, the at least Y slots include Z slots, and the first time range includes X slots. The X slots correspond to first X slots of the Z slots.

In some embodiments, the at least Y slots belong to the first time range.

For example, when the number of slots included in the at least Y slots is smaller than the number of slots included in the first time range, the at least Y slots are selected within the first time range, as illustrated in (b) of FIG. 13.

In some embodiments, the terminal device selects the at least Y slots based on slots included in an intersection of the first time range and the selection window.

For example, when there is a partial overlap between the first time range and the selection window, the selected Y slots should include slots within the partial overlap, as illustrated in (c) in FIG. 13.

In some embodiments, the at least Y slots belonging to the first time range includes the at least Y slots including Z slots. The Z slots are first Z slots within the first time range, Z being a positive integer.

In some embodiments, the DRX configuration information of the terminal device includes at least one parameter of a first timer, a DRX cycle parameter, or a slot offset. The first timer is used to indicate a duration started from a start position of a DRX cycle. The DRX cycle parameter is used to indicate a cycle of DRX. The slot offset is used to determine a start time domain position of the DRX cycle.

For example, the first timer is a sidelink DRX duration timer (sl-drx-onDurationTimer).

It should be noted that the terminal device is in the DRX ON state during the duration started from the start position of the DRX cycle indicated by the first timer.

Thus, in the embodiments of the present disclosure, the terminal device may perform the sensing based on the set of periodicity values for the periodic reservation allowed for the target resource pool and/or the periodicity value for sensing by the terminal device. Therefore, periodicity values selected by the terminal device for the sensing in the resource selection process are all supported by the terminal device, which meet the sensing demand of NR-V2X in the resource selection process.

Further, in the embodiments of the present disclosure, only slots corresponding to one period before a selected slot need to be sensed within the sensing window. The sensing may be performed for reservation periodicity values supported by the target resource pool. The transmission resource is selected based on the sensing result.

Method embodiments of the present disclosure are described in detail above with reference to FIG. 11 to FIG. 13. Device embodiments of the present disclosure will be described in detail below with reference to FIG. 14 to FIG. 17. It should be understood that the device embodiments and the method embodiments correspond to each other, and thus reference may be made to the method embodiments for similar description.

Figure 14:
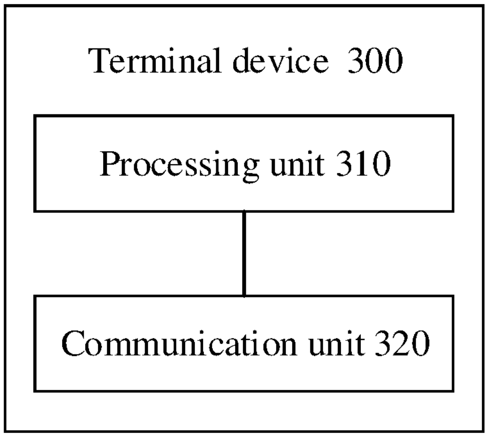
FIG. 14 is a schematic block diagram showing a terminal device according to an embodiment of the present disclosure.

FIG. 14 illustrates a schematic block diagram of a terminal device 300 according to an embodiment of the present disclosure. As illustrated in FIG. 14, the terminal device 300 includes a processing unit 310 and a communication unit 320.

The processing unit 310 is configured to obtain configuration information. The configuration information includes a set of periodicity values for periodic reservation allowed for a target resource pool and/or a periodicity value for sensing by the terminal device.

The communication unit 320 is configured to perform sensing based on the configuration information.

Optionally, the processing unit 310 is further configured to select at least Y slots in a selection window, Y being a positive integer; and the communication unit 320 is specifically configured to sense a resource on a slot $$t^{SL}_{y-P_s}$$

for sidelink transmission, where $$t^{SL}_{y}$$

represents a slot y for sidelink transmission, the slot y being any one of the at least Y slots;

$$t^{SL}_{y-P_s}$$

represents a slot y−$P_s$ for sidelink transmission; and $P_s$ represents any non-zero periodicity value in the set of periodicity values allowed for the target resource pool, or $P_s$ represents the periodicity value for sensing by the terminal device.

Optionally, the processing unit 310 is further configured to select at least Y slots in a selection window, Y being a positive integer; and the communication unit 320 is specifically configured to sense a resource on a slot $$t^{SL}_{y-P'_s}$$

for sidelink transmission, where $$t_y^{SL}$$

represents a slot y for sidelink transmission, the slot y being any one of the at least Y slots;

$$t_{y-P_s'}^{SL}$$

represents a slot y−$P_s$' for sidelink transmission; $P_s$' represents a number of logical slots corresponding to $P_s$, or $P_s$' represents a number of logical slots corresponding to $P_s$ in the target resource pool; and $P_s$ represents any non-zero periodicity value in the set of periodicity values allowed for the target resource pool, or $P_s$ represents the periodicity value for sensing by the terminal device.

Optionally, the processing unit 310 is further configured to select at least Y slots in a selection window, Y being a positive integer; and the communication unit 320 is specifically configured to refrain from sensing any resource on a slot $$t_{y-P_s'}^{SL}$$

when y−$P_s$' is greater than or equal to 0; or the communication unit 320 is specifically configured to sense a resource on a slot $$t_{y-P_s'}^{SL}$$

when y−$P_s$' is smaller than 0; or the communication unit 320 is specifically configured to sense the resource on the slot $$t_{y-P_s'}^{SL}$$

when y−$P_s$' is smaller than 0 and the slot $$t_{y-P_s'}^{SL}$$

is located within a sensing window, where $$t_y^{SL}$$

represents a slot y for sidelink transmission, the slot y being any one of the at least Y slots;

$$t_{y-P_s'}^{SL}$$

represents a slot y−$P_s$' for sidelink transmission; $P_s$' represents a number of logical slots corresponding to $P_s$, or $P_s$' represents a number of logical slots corresponding to $P_s$ in the target resource pool; and $P_s$ represents any non-zero periodicity value in the set of periodicity values allowed for the target resource pool, or $P_s$ represents the periodicity value for sensing by the terminal device.

Optionally, the processing unit 310 is further configured to select at least Y slots in a selection window, Y being a positive integer; and the communication unit 320 is specifically configured to sense a resource on a slot $$t_{y-q*P_s'}^{SL}$$

for sidelink transmission when $P_s<T_s$; or the communication unit 320 is specifically configured to sense a resource on a target slot for sidelink transmission when $P_s<T_s$. The target slot is a slot located within a sensing window among Q slots corresponding to $$t_{y-q*P_s'}^{SL},$$

or the target slot is the last one of slots located within the sensing window among the Q slots corresponding to $$t_{y-q*P_s'}^{SL},$$

where $T_s$ represents a number of milliseconds corresponding to an end position of the selection window;

$$t_y^{SL}$$

represents a slot y for sidelink transmission, the slot y being any one of the at least Y slots;

$$t_{y-q*P_s'}^{SL}$$

represents a slot y−q*$P_s$' for sidelink transmission; $P_s$' represents a number of logical slots corresponding to $P_s$, or $P_s$' represents a number of logical slots corresponding to $P_s$ in the target resource pool; $P_s$ represents any non-zero periodicity value in the set of periodicity values allowed for the target resource pool, or $P_s$ represents the periodicity value for sensing by the terminal device; q=1, 2, . . . , Q $$Q=\left\lceil \frac{T_s}{P_s} \right\rceil,$$

and $T_s$ is determined based on the end position $T_2$ of the selection window [n+$T_1$, n+$T_2$].

Optionally, the processing unit 310 is further configured to select at least Y slots in a selection window, Y being a positive integer; the processing unit 310 is further configured to determine to sense a resource on a slot $$t_{y-P_s'}^{SL}$$

for sidelink transmission; and the communication unit 320 is specifically configured to sense, when the slot $$t^{SL}_{y-P'_s}$$

does not belong to the target resource pool, the first slot belonging to the target resource pool after the slot $$t^{SL}_{y-P'_s},$$

or the communication unit 320 is specifically configured to sense, when the slot $$t^{SL}_{y-P'_s}$$

does not belong to the target resource pool, the first slot belonging to the target resource pool before the slot $$t^{SL}_{y-P'_s},$$

where $$t^{SL}_{y}$$

represents a slot y for sidelink transmission, the slot y being any one of the at least Y slots;

$$t^{SL}_{y-P'_s}$$

represents a slot y−$P_s$' for sidelink transmission; $P_s$" represents a number of logical slots corresponding to $P_s$, or $P_s$" represents a number of logical slots corresponding to $P_s$ in the target resource pool; and $P_s$ represents any non-zero periodicity value in the set of periodicity values allowed for the target resource pool, or $P_s$ represents the periodicity value for sensing by the terminal device.

Optionally, the processing unit 320 is further configured to calculate $P_s$' according to:

$$P'_s = \left\lceil \frac{N}{20\text{ ms}} \times P_s \right\rceil,$$

where N represents a number of slots available for sidelink transmission in 20 ms.

Optionally, the processing unit 310 is specifically configured to select the at least Y slots in the selection window based on a minimum number of candidate slots in the target resource pool.

Optionally, the processing unit 310 is further configured to determine the minimum number of candidate slots based on a priority of data to be transmitted and/or a Channel Busy Ratio (CBR).

Optionally, the processing unit 310 is further configured to determine the minimum number of candidate slots based on an energy saving level. The energy saving level is determined based on a capacity of the terminal device and/or a remaining battery level of the terminal device.

In some embodiments, the processing unit 310 is specifically configured to select the at least Y slots based on DRX configuration information of the terminal device.

In some embodiments, the processing unit 310 is specifically configured to: determine a first time range based on the DRX configuration information of the terminal device, and select the at least Y slots based on the first time range. The terminal device is in a DRX ON state during the first time range.

In some embodiments, the processing unit 310 is specifically configured to select the at least Y slots based on slots included in an intersection of the first time range and the selection window.

In some embodiments, the at least Y slots belong to the first time range; or the at least Y slots include all slots within the first time range.

In some embodiments, the at least Y slots belonging to the first time range includes the at least Y slots including Z slots. The Z slots are first Z slots within the first time range, Z being a positive integer.

In some embodiments, the DRX configuration information of the terminal device includes at least one parameter of a first timer, a DRX cycle parameter, or a slot offset. The first timer is used to indicate a duration started from a start position of a DRX cycle. The DRX cycle parameter is used to indicate a cycle of DRX. The slot offset is used to determine a start time domain position of the DRX cycle.

Optionally, the set of periodicity values allowed for the target resource pool includes at least one and up to sixteen periodicity values of 0 ms, 1 ms, 2 ms, . . . , 99 ms, 100 ms, 200 ms, 300 ms, 400 ms, 500 ms, 600 ms, 700 ms, 800 ms, 900 ms, or 1000 ms.

Optionally, the target resource pool supports aperiodic service transmission when the set of periodicity values allowed for the target resource pool includes 0 ms.

Optionally, different energy saving levels correspond to different periodicity values of the sensing by the terminal device; or different priorities correspond to different periodicity values of the sensing by the terminal device.

Optionally, in some embodiments, the communication unit may be a communication interface or a transceiver, or an input/output interface of a communication chip or a system on a chip. The processing unit may be one or more processors.

It should be understood that the terminal device 300 according to the embodiments of the present disclosure may correspond to the terminal device in the method embodiments of the present disclosure. In addition, the above and other operations and/or functions of each unit in the terminal device 300 are respectively intended to implement corresponding processes of the terminal device in the method 200 illustrated in FIG. 11. For brevity, details thereof will be omitted herein.

Figure 15:
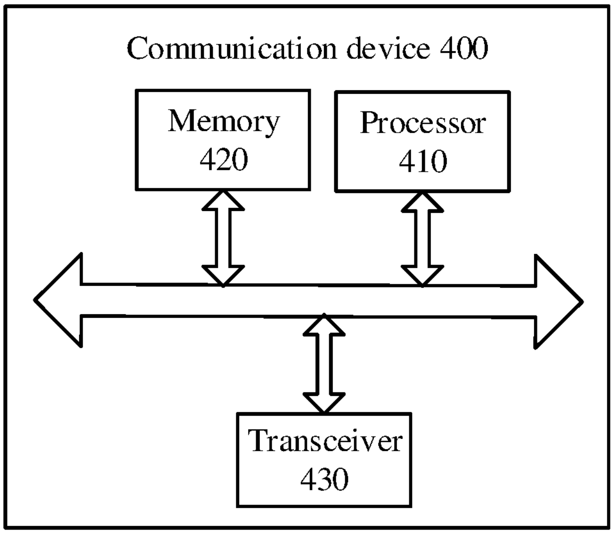
FIG. 15 is a schematic block diagram showing a communication device according to an embodiment of the present disclosure.

FIG. 15 is a schematic diagram showing a structure of a communication device 400 according to an embodiment of the present disclosure. The communication device 400 illustrated in FIG. 15 includes a processor 410. The processor 410 is configured to invoke and run a computer program from a memory to implement the method according to any of the embodiments of the present disclosure.

Optionally, as illustrated in FIG. 15, the communication device 400 may further include a memory 420. The processor 410 may invoke and run a computer program from the memory 420 to implement the method according to any of the embodiments of the present disclosure.

Here, the memory 420 may be a separate component independent of the processor 410, or may be integrated in the processor 410.

Optionally, as illustrated in FIG. 15, the communication device 400 may further include a transceiver 430. The processor 410 may control the transceiver 430 to communicate with other devices, specifically, to transmit information or data to other devices, or receive information or data transmitted by other devices.

Here, the transceiver 430 may include a transmitter and a receiver. The transceiver 430 may further include one or more antennas.

Optionally, the communication device 400 may specifically be a terminal device according to an embodiment of the present disclosure. The communication device 400 may execute corresponding processes implemented by the terminal device in the method according to any of the embodiments of the present disclosure. For brevity, details thereof will be omitted herein.

Figure 16:
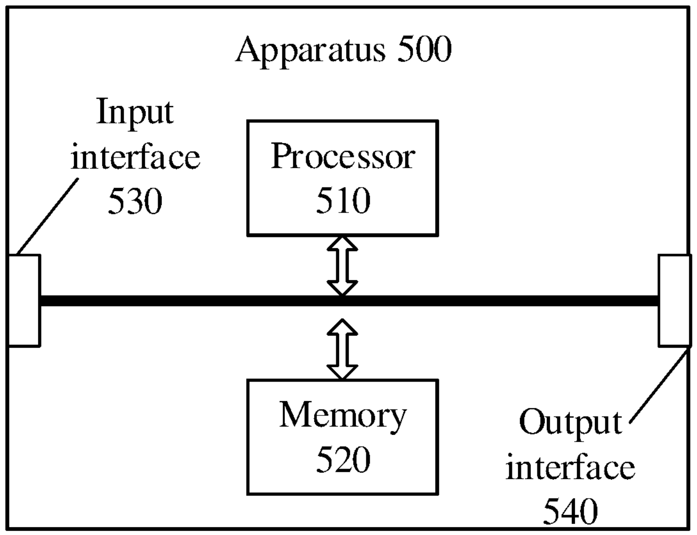
FIG. 16 is a schematic block diagram showing an apparatus according to an embodiment of the present disclosure.

FIG. 16 is a schematic diagram showing a structure of an apparatus according to an embodiment of the present disclosure. An apparatus 500 illustrated in FIG. 16 includes a processor 510. The processor 510 can invoke and run a computer program from the memory to implement the method according to any of the embodiments of the present disclosure.

Optionally, as illustrated in FIG. 16, the apparatus 500 may further include a memory 520. The processor 510 may invoke and run a computer program from the memory 520 to implement the method according to any of the embodiments of the present disclosure.

Here, the memory 520 may be a separate component independent of the processor 510, or may be integrated in the processor 510.

Optionally, the apparatus 500 may further include an input interface 530. The processor 510 can control the input interface 530 to communicate with other devices or chips, specifically, to obtain information or data transmitted by other devices or chips.

Optionally, the apparatus 500 may further include an output interface 540. The processor 510 can control the output interface 540 to communicate with other devices or chips, specifically to output information or data to other devices or chips.

Optionally, the apparatus can be applied to the terminal device according to any of the embodiments of the present disclosure. In addition, the apparatus can implement corresponding processes implemented by the terminal device in the method according to any of the embodiments of the present disclosure. For brevity, details thereof will be omitted herein.

Optionally, the apparatus mentioned in the embodiments of the present disclosure may also be a chip, e.g., a system-level chip, a system-chip, a chip system, or a system-on-chip.

Figure 17:
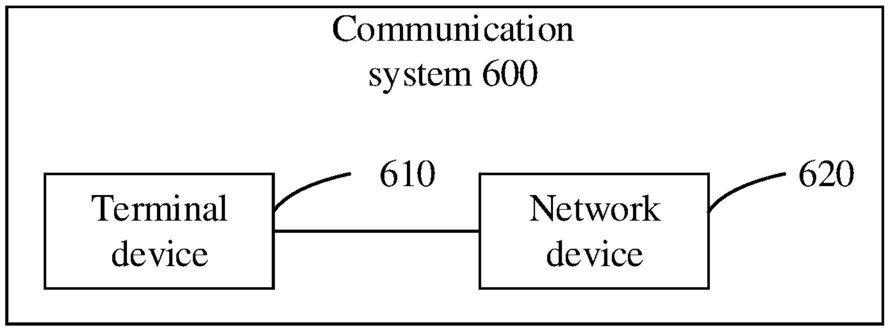
FIG. 17 is a schematic block diagram showing a communication system according to an embodiment of the present disclosure.

FIG. 17 is a schematic block diagram showing a communication system 600 according to an embodiment of the present disclosure. As illustrated in FIG. 17, the communication system 600 includes a terminal device 610 and a network device 620.

Here, the terminal device 610 can be configured to implement the corresponding functions implemented by the terminal device in the above methods. The network device 620 can be configured to implement corresponding functions implemented by the network device in the above methods. For brevity, details thereof will be omitted herein.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the terminal device in the embodiment of the present disclosure, and the computer program can cause a computer to perform corresponding procedures implemented by the terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the terminal device in the embodiment of the present disclosure, and the computer program instructions can cause a computer to perform corresponding procedures implemented by the terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the terminal device in the embodiment of the present disclosure. The computer program, when executed on a computer, can cause the computer to perform corresponding procedures implemented by the terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. For this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached

What is claimed is:

1. A sensing method, comprising:

obtaining, by a terminal device, configuration information, wherein the configuration information comprises a set of periodicity values for periodic reservation allowed for a target resource pool and a periodicity value for sensing by the terminal device; and performing, by the terminal device, sensing based on the configuration information;

wherein the performing, by the terminal device, sensing based on the configuration information comprises:

selecting, by the terminal device, at least Y slots in a selection window, where Y is a positive integer; and sensing, by the terminal device, a resource on a slot $$t^{SL}_{y-P'_s}$$

for sidelink transmission, where $$t^{SL}_{y}$$

represents a slot y for sidelink transmission, the slot y being any one of the at least Y slots;

$$t^{SL}_{y-P'_s}$$

represents a slot y−$P_s$' for sidelink transmission; $P_s$' represents a number of logical slots corresponding to $P_s$ in the target resource pool; and $P_s$ represents the periodicity value for sensing by the terminal device.

2. The method according to claim 1, further comprising: calculating, by the terminal device, $P_s$' according to:

$$P'_s = \left\lceil \frac{N}{20\text{ ms}} \times P_s \right\rceil,$$

where N represents a number of slots available for sidelink transmission in 20 ms.

3. The method according to claim 1, wherein said selecting, by the terminal device, the at least Y slots in the selection window comprises:

selecting, by the terminal device, the at least Y slots in the selection window based on a minimum number of candidate slots in the target resource pool.

4. The method according to claim 3, further comprising: determining, by the terminal device, the minimum number of candidate slots based on a priority of data to be transmitted and/or a Channel Busy Ratio (CBR).

5. The method according to claim 3, further comprising: determining, by the terminal device, the minimum number of candidate slots based on an energy saving level, wherein the energy saving level is determined based on a capacity of the terminal device and/or a remaining battery level of the terminal device.

6. The method according to claim 1, wherein the set of periodicity values allowed for the target resource pool comprises at least one and up to sixteen periodicity values of:

0 ms, 1 ms, 2 ms, . . . , 99 ms, 100 ms, 200 ms, 300 ms, 400 ms, 500 ms, 600 ms, 700 ms, 800 ms, 900 ms, or 1000 ms.

7. The method according to claim 6, wherein the target resource pool supports aperiodic service transmission when the set of periodicity values allowed for the target resource pool comprises 0 ms.

8. The method according to claim 1, wherein different energy saving levels correspond to different periodicity values for sensing by the terminal device; or different priorities correspond to different periodicity values for sensing by the terminal device.

9. The method according to claim 1, wherein the periodicity value for sensing by the terminal device is used to indicate a periodicity value, based on which the terminal device performs the sensing.

10. A terminal device, comprising a processor and a memory, wherein the memory has a computer program stored thereon, and the processor is configured to invoke and execute the computer program stored in the memory to:

obtain configuration information, wherein the configuration information comprises a set of periodicity values for periodic reservation allowed for a target resource pool and a periodicity value for sensing by the terminal device; and perform sensing based on the configuration information;

wherein to perform sensing based on the configuration information, the processor is configured to invoke and execute the computer program stored in the memory to:

select at least Y slots in a selection window, where Y is a positive integer; and sense a resource on a slot $$t^{SL}_{y-P'_s}$$

for sidelink transmission, where $$t^{SL}_{y}$$

represents a slot y for sidelink transmission, the slot y being any one of the at least Y slots;

$$t^{SL}_{y-P'_s}$$

represents a slot y−$P_s$' for sidelink transmission; $P_s$' represents a number of logical slots corresponding to $P_s$ in the target resource pool; and $P_s$ represents the periodicity value for sensing by the terminal device.

11. The terminal device according to claim 10, wherein the periodicity value for sensing by the terminal device is used to indicate a periodicity value, based on which the terminal device performs the sensing.

12. The terminal device according to claim 10, wherein the processor is further configured to invoke and execute the computer program stored in the memory to:

calculate $P_s$' according to:

$$P'_s = \left\lceil \frac{N}{20\text{ ms}} \times P_s \right\rceil,$$

where N represents a number of slots available for sidelink transmission in 20 ms.

13. The terminal device according to claim 10, wherein to select the at least Y slots in the selection window, the processor is configured to invoke and execute the computer program stored in the memory to:

select the at least Y slots in the selection window based on a minimum number of candidate slots in the target resource pool.

14. The terminal device according to claim 13, wherein the processor is configured to invoke and execute the computer program stored in the memory to:

determine the minimum number of candidate slots based on a priority of data to be transmitted and/or a Channel Busy Ratio (CBR).

15. The terminal device according to claim 13, wherein the processor is configured to invoke and execute the computer program stored in the memory to:

determine the minimum number of candidate slots based on an energy saving level, wherein the energy saving level is determined based on a capacity of the terminal device and/or a remaining battery level of the terminal device.

16. The terminal device according to claim 10, wherein the set of periodicity values allowed for the target resource pool comprises at least one and up to sixteen periodicity values of:

0 ms, 1 ms, 2 ms, . . . , 99 ms, 100 ms, 200 ms, 300 ms, 400 ms, 500 ms, 600 ms, 700 ms, 800 ms, 900 ms, or 1000 ms.

17. The terminal device according to claim 16, wherein the target resource pool supports aperiodic service transmission when the set of periodicity values allowed for the target resource pool comprises 0 ms.

18. The terminal device according to claim 10, wherein different energy saving levels correspond to different periodicity values for sensing by the terminal device; or different priorities correspond to different periodicity values for sensing by the terminal device.

* * * * *